United States Patent [19]
Spelter et al.

[11] Patent Number: 5,394,562
[45] Date of Patent: Feb. 28, 1995

[54] POWER SUPPLY CIRCUIT FOR A TWO-MODE VEHICULAR RADIO RECEIVER

[75] Inventors: Michael Spelter, Hildesheim; Thomas Menzel, Holle, both of Germany

[73] Assignee: Blaupunkt-Werke GmbH, Hildesheim, Germany

[21] Appl. No.: 105,519

[22] Filed: Aug. 11, 1993

[30] Foreign Application Priority Data

Aug. 25, 1992 [DE] Germany .................. 4228116

[51] Int. Cl.[6] ..................... H04B 1/16; F02P 9/00
[52] U.S. Cl. .................. 455/186.1; 455/343; 455/345; 307/10.6
[58] Field of Search ............. 455/343, 38.3, 345, 455/186.1, 185.1; 307/9.1, 10.1, 10.6, 10.7, 38, 39, 115, 130

[56] References Cited

U.S. PATENT DOCUMENTS

| | | | |
|---|---|---|---|
| 4,227,257 | 10/1980 | Sato | 455/343 |
| 5,060,300 | 10/1991 | Luber et al. | 455/343 |
| 5,101,510 | 3/1992 | Duckeck | 455/343 |

FOREIGN PATENT DOCUMENTS

| | | |
|---|---|---|
| 2910073C2 | 10/1982 | Germany . |
| 0208031 | 8/1989 | Japan .................. 455/345 |

*Primary Examiner*—Edward F. Urban
*Assistant Examiner*—Mark D. Wisler
*Attorney, Agent, or Firm*—Frishauf, Holtz, Goodman & Woodward

[57] ABSTRACT

A vehicular radio receiver having a decoder and memory for traffic announcements digitally modulated on a carrier wave that is otherwise modulated by audio signals has separate power input terminals for the portions (A) necessary for recognizing and storing traffic announcements and for (B) all other functions of the vehicular radio receiver. An energy saving circuit connected to these power input terminals of the vehicular radio receiver is energizable by a first power input terminal connected to the vehicular battery through an ignition lock switch of the vehicle, and also by a second power input terminal for supplying, at low current through a low-pass filter, for supplying electricity only to the circuits necessary for recognizing and storing traffic announcements. The energy saving circuit has a first electrically controlled switch for supplying the traffic announcement circuits of the receiver when an ON/OFF switch of the vehicular radio is in its OFF position and when no operating voltage is present at the first power input terminal. A second electrically controlled switch is provided for responding to the turning on of the ignition lock switch and the consequent opening of the first electrically controlled switch, while the radio ON/OFF switch remains open, for supplying power to only the circuits of the receiver for storing announcement data. When the entire vehicular radio is activated by its ON/OFF switch, the respective outputs of the additional switches are blocked by diodes.

10 Claims, 2 Drawing Sheets

POWER SUPPLY CIRCUIT FOR A TWO-MODE VEHICULAR RADIO RECEIVER

FIELD OF THE INVENTION

This invention concerns a power supply for an automobile radio receiver having a first mode of operation for receiving and storing traffic announcements and advice and a second mode of operation which is not limited to the functions of the first mode, but also includes the operation of low frequency and final stages so that normal broadcasts are also receivable.

BACKGROUND AND PRIOR ART

It is already known to provide first and second connection terminals for a vehicular radio receiver, the second terminal serving for continuous furnishing of electric power to the circuits of the receiver for storing announcement data and/or coding for an alarm system to counteract vehicle theft, while the other reception portions and the audio reproducing portions of the vehicular radio connected to the first terminal can be switched off by the ignition switch of the motor vehicle.

It is known from German Patent 29 10 073C2 to provide an automobile broadcast radio receiver with a traffic announcement decoder, with announcement recognition and with automatically controlled recording and reproduction stages, whereby a digital memory is provided for recording the traffic announcements. In that known system the receiver, traffic radio decoder and memory are continuously switched on.

An energy saving circuit is known from U.S. Pat. No. 5,301,510, which connects the power supply only to the stages necessary for evaluation of the traffic announcements, but only until there is a need for reception and reproduction of a broadcast transmission. This known energy saving circuit loads the vehicle battery even when there is no need to reproduce an audio broadcast and the auto-radio is accordingly switched off.

SUMMARY OF THE INVENTION

It is an object of the present invention to provide an energy saving circuit by control of the consumption of energy from the battery so as to provide an improved energy economy.

Briefly, a first additional switch is provided for connecting said second terminal for power supply of said vehicular radio to said circuits of the receiver for storing announcement data when said ON/OFF switch of said vehicular radio is in its OFF position and when no operating voltage is present at said first power connection terminal. A second additional switch is provided for responding to the turning on the ignition lock switch and the consequent opening of said first additional switch, while the radio ON/OFF switch remains open, by closing of said second additional switch to supply power from said first terminal to only said circuits of the receiver for storing announcement data. When the entire vehicular radio is activated by its said ON/OFF switch, the respective outputs of both additional switches are blocked by semiconductor elements—for example, by diodes.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
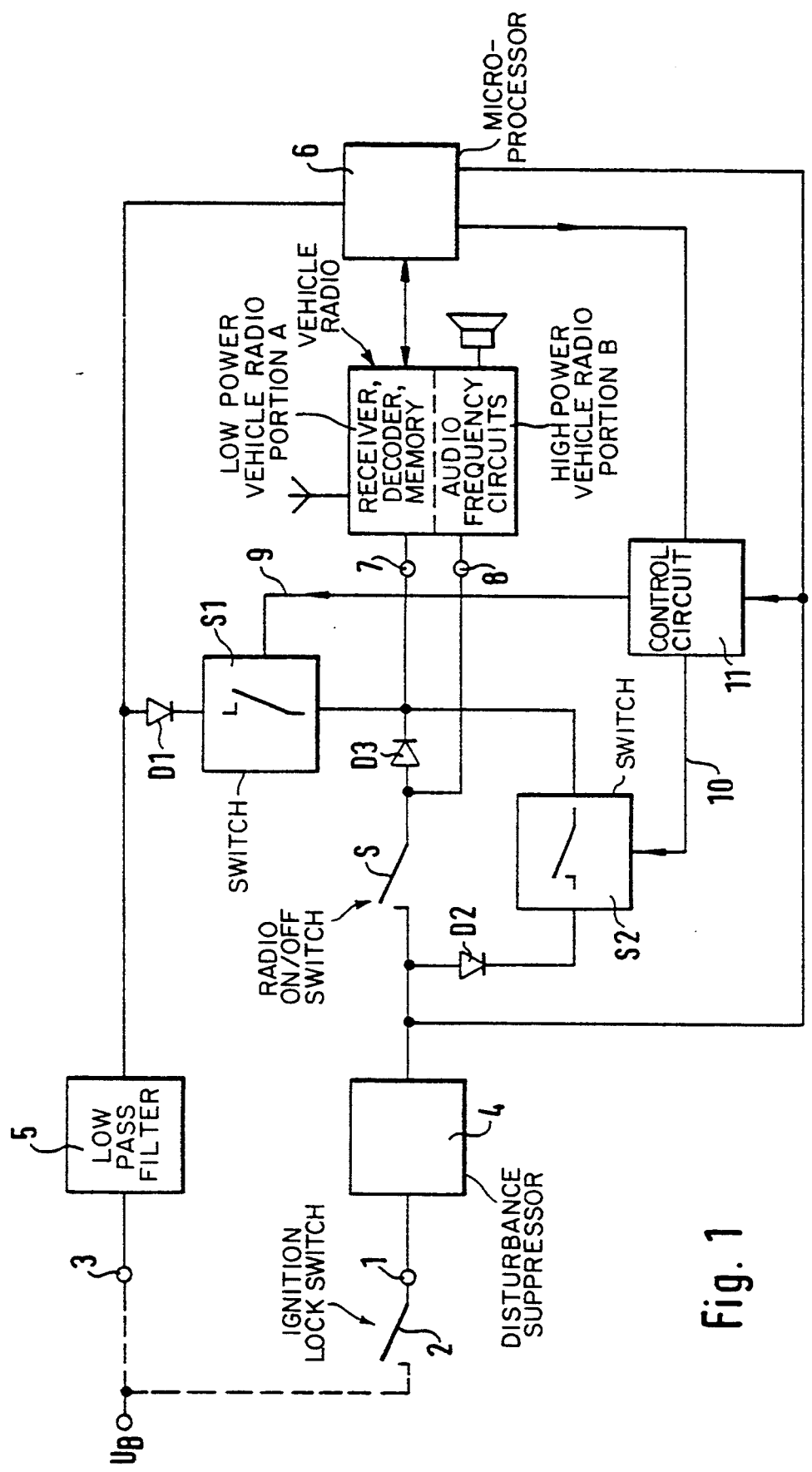
Fig. 1 is a circuit block diagram of the power supply for a vehicular radio in accordance with the invention.

In the block circuit diagram of FIG. 1, there is shown in a simplified fashion, a vehicular radio having two portions A and B, which portions A & B are low power and high power vehicle radio portions, respectively, served by various components of an energy saving power supply circuit. The circuit of FIG. 1 has a first current input terminal 1 connected through an ignition lock switch 2 to a voltage source $U_B$. The voltage $U_B$ is enhanced by a generator (not shown) of the vehicular electrical system as a result of turning on the ignition of the vehicle in which the radio receiver is installed. A second current input terminal 3 is provided for supplying at low power a constantly present voltage $U_B$ regardless of the position of the ignition switch. The ignition lock switch is considered in this description as turned on only when an ignition circuit of an internal combustion engine is turned on to enable the engine to be started and to operate thereafter.

The first input terminal 1 of the circuit of FIG. 1 is connected to a circuit 4 which serves to suppress interference from pulses present in the vehicle electrical system, this disturbance suppressing circuit 4 being designed for passing the maximum electric current requirement of the vehicular radio. The output of the circuit 4 is connected to the input of a radio ON/OFF switch S which is part of the vehicular radio. The second input terminal 3 is connected, through a high-frequency (low-pass) filter 5 designed for small current, to a microprocessor 6. The output of the high-frequency filter 5 is additionally connected, through a diode D1 poled for passing current from the source $U_B$, to a portion of the energy-saving circuit controlled by the microprocessor 6. The diode D1 leads to a first electrically controllable switch S1 which leads to an operating voltage terminal 7 of the portion A of the vehicular radio. The low power portion A of the radio contains the means necessary for receiving and automatically storing traffic information directed to vehicles. Digital memories are provided for the traffic information and are subject to updating and call-out.

The output of the disturbance suppressing circuit 4 is also connected to the operating voltage terminal 7 of the portion A of the vehicular radio through a forwardly poled diode D2 and a second electrically controllable switch 2. The output terminal of the ON/OFF switch S of the radio receiver is also connected through a forward poled diode D3 to the operating voltage terminal 7. The radio ON/OFF switch S, because it is in series with the ignition lock switch 2, is also connected to the operating voltage terminal 8 of the high power portion B of the vehicular radio which comprises low frequency and final stages.

The control inputs of the electrically controllable switches S1 and S2 are respectively connected, by control conductors 9 and 10, to the outputs of a control circuit 11. The output of the disturbance suppressing circuit 4 is connected to a first input of the control circuit 11 and is connected to an input of the microprocessor 6. A further input of the control circuit 11 is connected by a connection 12 with an output of the microprocessor 6.

Figure 2:
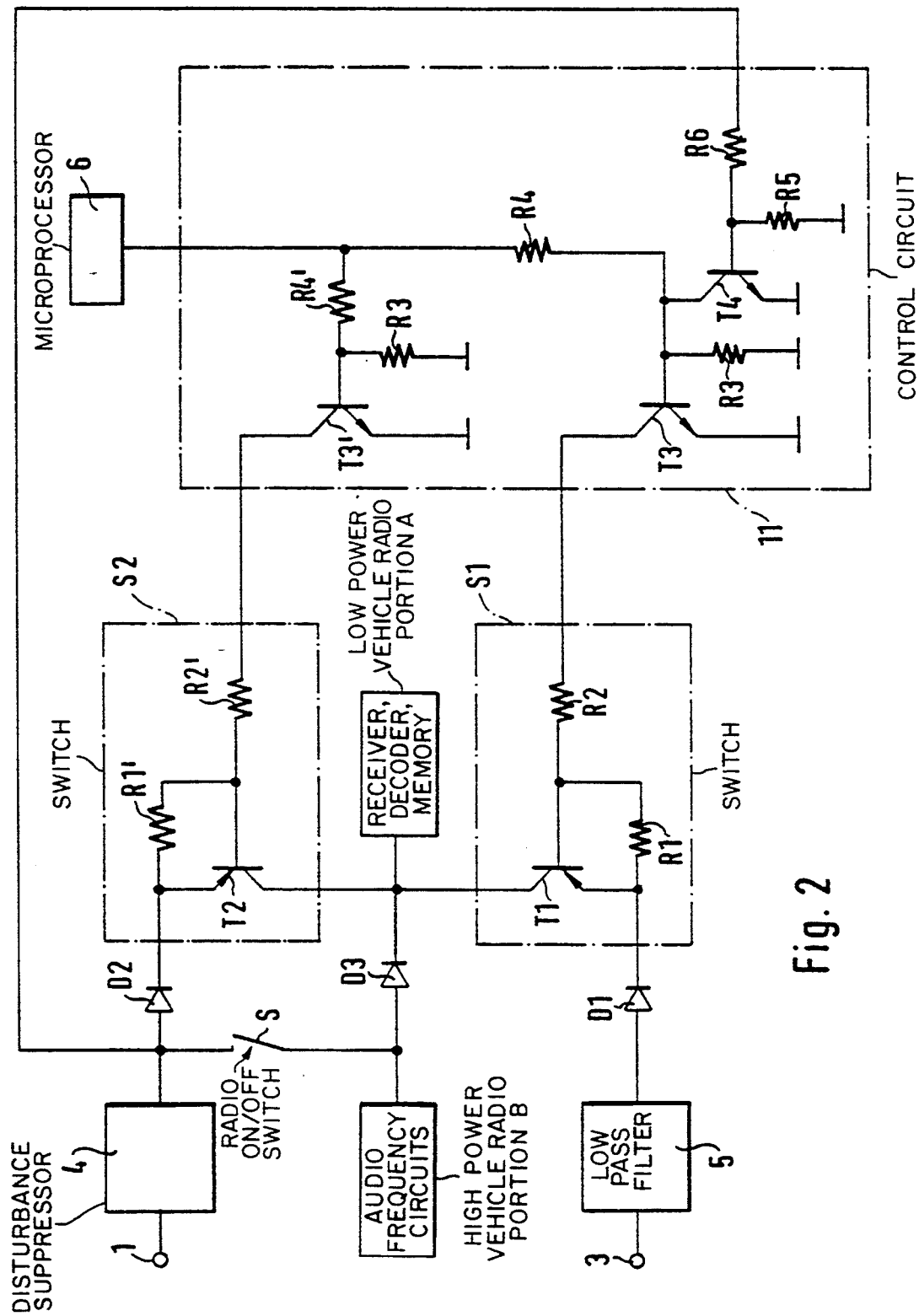
FIG. 2 is a more detailed circuit diagram of the same power supply, showing the use of semiconductor devices as controlled switches.

FIG. 2 shows in detail the controllable switches S1 and S2 as well as the control circuit 11. The input connections of the microprocessor 6 shown in FIG. 1 are omitted to simplify FIG. 2. As shown in FIG. 2, the respective inputs of the switches S1 and S2 which are connected to D1 and D2 are the respective emitters of PNP transistors T1 and T2. These transistors each have a collector electrode connected to the operating voltage terminal 7 of the portion A of the vehicular radio. The respective base electrodes of the transistors T1 and T2 are connected by respective resistances R1 and R1' to the respective emitters of T1 and T2 and are connected by respective resistances R2 and R2' with the respective control inputs of the switches S1 and S2.

These inputs of the switches S1 and S2 are respectively provided with outputs of the control circuit 11 and are respectively connected with collectors of NPN transistors T3 and T3' which have their respective emitters connected to ground. The respective resistances R3 and R3' connect the respective bases of transistors T3 and T3' to ground and those bases are also respectively connected through resistances R4 and R4' and the connection 12 to a common output of the microprocessor 6. The base of the NPN transistor T3, for actuating the first controllable switch S1, is connected with the collector of another NPN transistor T4 which has its emitter connected to ground. The base of the transistor T4 is connected through a resistance R5 to ground and is connected through a resistance R6 directly to the input terminal of the diode D2 and, through the radio ON/OFF switch S, to the input terminal of the diode D3.

When the vehicular radio is in full operation, the radio ON/OFF switch S is closed and the ignition lock has turned on the vehicular radio. The operating voltage $U_B$ is directly supplied to the portion B of the vehicular radio and is supplied through the diode D3 to the portion A of the radio. In the operation conditions described below, however, the radio ON/OFF switch S is opened, whereby the current-intensive portion B containing the low frequency and final stages are left without supply of operating voltage. The microprocessor 6 informs the receiver and the control circuit 11 through their further inputs (shown only in FIG. 1) when traffic radio transmitters need to be received and their transmissions stored. The control circuit 11 checks whether the operating voltage $U_B$ is present at its first input and therefore also at the first power connection terminal 1. If this is not the case, the control circuit 11 closes the first electrically controllable switch S1. The operating voltage $U_B$ is thereby supplied through the second input terminal 3, the filter circuit 5, the diode D1 and the switch S1 to the operating voltage terminal 7. The portion A of the vehicular radio is thereby switched on, while the portion B receives no operating voltage. The vehicular radio can thus receive traffic announcements and automatically store them after the ignition lock has been put in the OFF position. If the ignition lock 2 of FIG. 1 is turned on, however, the operating voltage $U_B$ proceeds through the disturbance-suppression circuit 4 to the first input of the control circuit 11 and causes that circuit to open the first electrically controllable switch S1 and to close the second controllable switch S2. The operating voltage $U_B$ is thereby supplied by way of the first terminal 1, the disturbance suppression circuit 4, the diode 2 and the switch S2 to the operating voltage terminal 7 of the portion A of the vehicular radio, which is turned on, while its portion B receives no operating voltage unless the radio ON/OFF switches is turned ON. Because its portion A is energized, the vehicular radio that in other respects is switched off may now automatically receive the operating voltage $U_B$ through the disturbance suppression circuit 4 serving the vehicular radio while the ignition lock is switched to an ON position and, after motor start, when the motor is running. It is thus unnecessary to provide a further expensive disturbance suppression circuit. It is sufficient to provide a much less expensive and economical high-frequency filter 5 for use when the ignition lock is in the OFF position.

Although the invention has been described with reference to a particular illustrative embodiment, it will be recognized that variations and modifications are possible within the inventive concept.

We claim:

1. A vehicular radio receiver having a plurality of stages, for receiving at least audio frequency broadcast signals, said vehicular radio receiver comprising:

a first power input terminal for connection of power to all stages of said vehicular radio receiver through both an ignition lock switch of a vehicle in which said vehicular radio receiver is located and an ON/OFF switch of said vehicular radio receiver;

a second power input terminal directly connected to a permanently energized side of said ignition lock switch;

decoder and memory means for receiving and storing traffic announcements which are separately transmitted by a separate transmitter on a same carrier wave as an audio frequency broadcast signal, which traffic announcements are receivable by said vehicular radio receiver;

reception means coupled to said decoder and memory means for receiving, recognizing and storing traffic announcements when said ON/OFF switch of said vehicular radio receiver is in an OFF position and no operating voltage is present at said first power input terminal; and an energy-saving circuit means for continuously supplying power from said second power input terminal only to said decoder and memory means and to said reception means of said vehicular radio receiver for providing announcements to said decoder and memory means;

said energy saving circuit means being connected to both said first and second power input terminals of said radio receiver, and said energy saving circuit means comprising:

a first electrically controllable switch means (S1) for connecting said second power input terminal (3) only to said decoder and memory means and to said reception means;

a second electrically controllable switch means (S2), connected for responding to a turning ON of said ignition lock switch (2) and consequent opening of said first electrically controllable switch means (S1), for supplying power through said second electrically controllable switch means (S2) from said first power input terminal (1) to only said decoder and memory means and to said reception means which recognizes and causes storing of traffic announcements;

semiconductor elements (D1, D2, D3) connected for automatically blocking respective outputs of said first and second electrically controllable switch means (S1, S2) when all stages of said vehicular radio receiver are activated by a turn-on of said ON/OFF switch of said vehicular radio receiver; and control circuit means (11) for operating said first and second electrically controllable switch means (S1, S2) in response to, at least, a voltage present at said first power input terminal (1).

2. The vehicular radio receiver of claim 1 wherein said control circuit means (11) includes:

a first input coupled to an input terminal of said ON/OFF switch (S) of said vehicular radio receiver;

two outputs which are respectively coupled to control inputs of said first and second electrically controllable switch means (S1, S2); and a second input coupled to receive a signal for activation and de-activation of said control circuit means.

3. The vehicular radio receiver of claim 2, further comprising a low-pass filter (5) coupled in an electric current path between said second power input terminal (3) and said first electrically controllable switch means (S1).

4. The vehicular radio receiver of claim 3, further comprising a microprocessor means (6), having inputs respectively connected to said first and second power input terminals (1, 3), for at least controlling activation of said control circuit means (11) by supplying a signal to said second input of said control circuit means (11).

5. The vehicular radio receiver of claim 1, further comprising a low-pass filter (5) coupled in an electric current path between said second power input terminal (3) and said first electrically controllable switch means (S1).

6. The vehicular radio receiver of claim 2, further comprising a microprocessor means (6), having inputs respectively connected to said first and second power input terminals (1, 3), for at least controlling activation of said control circuit means (11) by supplying a signal to said second input of said control circuit means (11).

7. The vehicular radio receiver of claim 5, further comprising a microprocessor mean (6), having inputs respectively connected to said first and second power input terminals (1, 3), for at least controlling activation of said control circuit means (11) by supplying a signal to said second input of said control circuit means (11).

8. The vehicular radio receiver of any one of claims 2, 5, 6 or 4, wherein each of said first and second electrically controllable switch means comprises a PNP switching transistor (T1, T2) having a base connected through a first resistance (R1, R1') with an emitter thereof and said base also being connected through a second resistance (R2, R2') to a control input of the respective electrically controllable switch means (S1, S2); and wherein each of said first and second electrically controllable switch means (S1, S2) has an output which is connected to a collector of an NPN switching transistor (T3, T3') which has an emitter connected to ground and base connected through a third resistance (R3, R3') to ground and connected through a fourth resistance (R4, R4') to said second input of said control circuit means (11); and wherein the base of said NPN switching transistor (T3) of said first electrically controllable switch means (S1) is connected with collector of a further NPN transistor (T4) which has an emitter which is grounded and has a base connected both through a fifth resistance (R5) to ground and through a sixth resistance (R6) to said first input of said control circuit means (11).

9. The vehicular radio receiver of any one of claims 1, 2, 5, 6 or 4, wherein said semiconductor elements (D1, D2, D3) for blocking respective outputs of said first and second electrically controllable switch means (S1, S2) comprise at plurality of diodes poled for conduction from said first power input terminal towards at least said decoder and memory means.

10. The vehicular radio receiver of claim 9, wherein said plurality of diodes comprised a first diode (D1) coupled between said second power input terminal (3) and said first electrically controllable switch means (S1);

a second diode (D2) coupled between said first power input terminal (1) and said second electrically controllable switch means (S2); and a third diode (D3) coupled between said ON/OFF switches of said vehicular radio receiver and a connection joining both of said first and second electrically controllable switch means (S1, S2) which connection is also connected to a terminal (7) of said vehicular radio receiver for supplying current only to said decoder and memory means, to most of said energy saving circuit means and to said reception means of said vehicle radio receiver to provide said traffic announcements to said decoder and memory means.

* * * * *